US008752016B2

(12) United States Patent
Hernandez Porras et al.

(10) Patent No.: US 8,752,016 B2
(45) Date of Patent: Jun. 10, 2014

(54) CONVERTING JAVASCRIPT INTO A DEVICE-INDEPENDENT REPRESENTATION

(75) Inventors: Victor Leonel Hernandez Porras, San Francisco, CA (US); Thomas John O'Brien, San Jose, CA (US); Roger Scott Hoover, Cheyenne, WY (US); Christopher Arthur Lattner, San Jose, CA (US); Eric Marshall Christopher, Los Gatos, CA (US); Pratik Solanki, Mountain View, CA (US); Jia-Hong Chen, Cupertino, CA (US); Michael Alan Kahl, Austin, TX (US)

(73) Assignee: Apple Inc., Cupertino, CA (US)

( * ) Notice: Subject to any disclaimer, the term of this patent is extended or adjusted under 35 U.S.C. 154(b) by 1196 days.

(21) Appl. No.: 12/316,730

(22) Filed: Dec. 15, 2008

(65) Prior Publication Data

US 2010/0153929 A1    Jun. 17, 2010

(51) Int. Cl.
*G06F 9/44*    (2006.01)
(52) U.S. Cl.
USPC ........... 717/122; 717/120; 717/168; 717/169; 717/172; 717/173

(58) Field of Classification Search
None
See application file for complete search history.

(56) References Cited

U.S. PATENT DOCUMENTS

| 6,665,688 | B1 | 12/2003 | Callahan, II |
| 2004/0143823 | A1 | 7/2004 | Wei |
| 2006/0059463 | A1* | 3/2006 | Janssen et al. ............... 717/120 |

* cited by examiner

*Primary Examiner* — Qamrun Nahar
(74) *Attorney, Agent, or Firm* — Womble Carlyle Sandridge & Rice LLP (57) ABSTRACT

A device-independent intermediate representation of a source code is generated and stored, e.g., in a memory or other storage mechanism. The stored intermediate representation of the source code is used to generate a device-specific machine code corresponding to the source code. The stored intermediate representation may be updated, e.g., periodically, for example by obtaining an updated version of the source code and compiling the updated source code to generate an updated intermediate representation. The stored intermediate representation may be based on source code received from a device that is synchronized with which a compiling device that generates the device-specific machine code. In some cases, the stored intermediate representation may be used to generate for each of a plurality of devices a corresponding device-specific machine code.

20 Claims, 11 Drawing Sheets

PRIOR ART

CONVERTING JAVASCRIPT INTO A DEVICE-INDEPENDENT REPRESENTATION

BACKGROUND OF THE INVENTION

Figure 1:
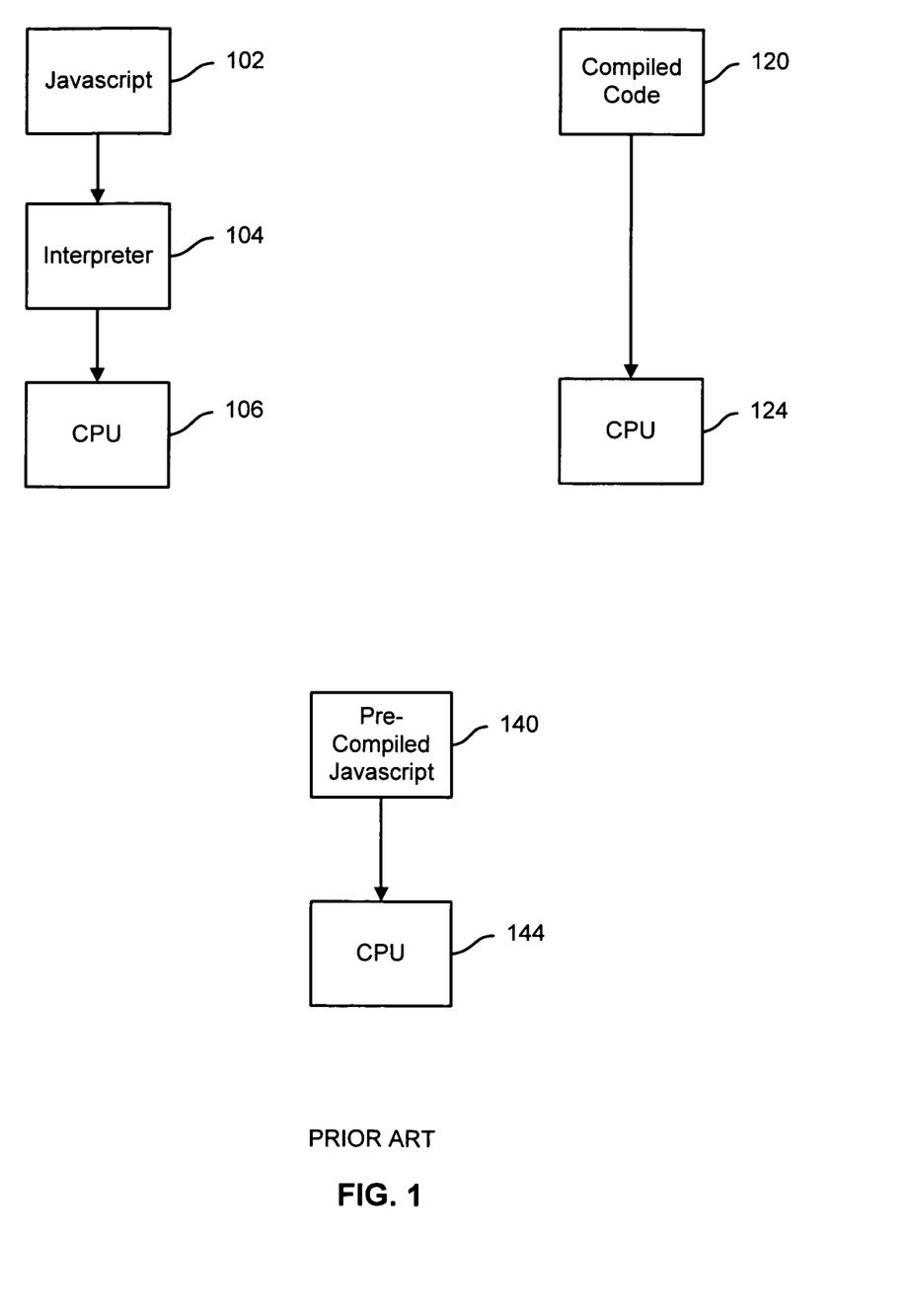

Traditionally, scripting languages such as JavaScript have been used to write typically short scripts that are executed by interpreting the script at runtime, e.g., using an interpreter, runtime environment, and/or other software entity. An example of such a typical configuration is shown in FIG. 1, specifically JavaScript 102 being executed at runtime by an interpreter 104 which interprets the JavaScript instructions and provides corresponding machine code instructions to central processing unit 106. By contrast, in traditional compiled programming languages, source code typically is compiled into machine code prior to runtime. Machine code comprises very low level instructions that are executable directly by a processor, e.g., compiled code 120 shown being provided directly to CPU 124 in FIG. 1, with the result that typically source code that has been compiled to machine code executes on a processor more quickly than equivalent interpreted (e.g., JavaScript) code that requires an interpreter to generate at runtime machine code executable by the processor. More recently, scripts and other code written in interpreted languages such as JavaScript have been precompiled to machine code executable directly by a processor, e.g., pre-compiled JavaScript (i.e., machine code generated prior to runtime based on JavaScript) 140 shown in FIG. 1 as being provided to CPU 144 for execution at runtime.

BRIEF DESCRIPTION OF THE DRAWINGS

Various embodiments of the invention are disclosed in the following detailed description and the accompanying drawings.

An example of such a typical configuration is shown in FIG. 1, specifically JavaScript 102 being executed at runtime by an interpreter 104 which interprets the JavaScript instructions and provides corresponding machine code instructions to central processing unit 106.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Converting code written in an interpreted language, such as JavaScript, into an intermediate representation, such as LLVM intermediate representation or another storable intermediate representation, is disclosed. In some embodiments, the intermediate representation is cached, e.g., in a memory, drive, or other storage mechanism on a device to which the intermediate representation has been downloaded and/or a personal computer, server, or other relatively more powerful device or system to which the intermediate representation, code, or underlying code in JavaScript or another traditionally interpreted language, has been downloaded (e.g., from a resource location associated with the code) and/or uploaded (e.g., from a relatively less powerful device, such as a PDA, phone, portable media player, etc.). In some embodiments, previously cached JavaScript or other code in a traditionally interpreted language and/or byte code or another derived intermediate representation thereof is updated, e.g., based on a schedule, an event such as receiving an indication that updated corresponding code is available, etc. In some embodiments, a cached (and in some embodiments periodically and/or otherwise updated) intermediate representation (or underlying JavaScript or other traditionally interpreted code) is used to generate at a synchronization time subsequent to the intermediate representation (or other code) being cached a machine-specific code usable by a device that is being synchronized with the system on which the intermediate representation (or other code) is cached, for example a device from which the underlying code was previously uploaded (e.g., to provide updated machine code based on updated underlying code, or to provide machine code compiled by the system to which the underlying code was earlier uploaded from the device being synchronized) or to a device other than a device from which the underlying code was first uploaded.

Figure 2:
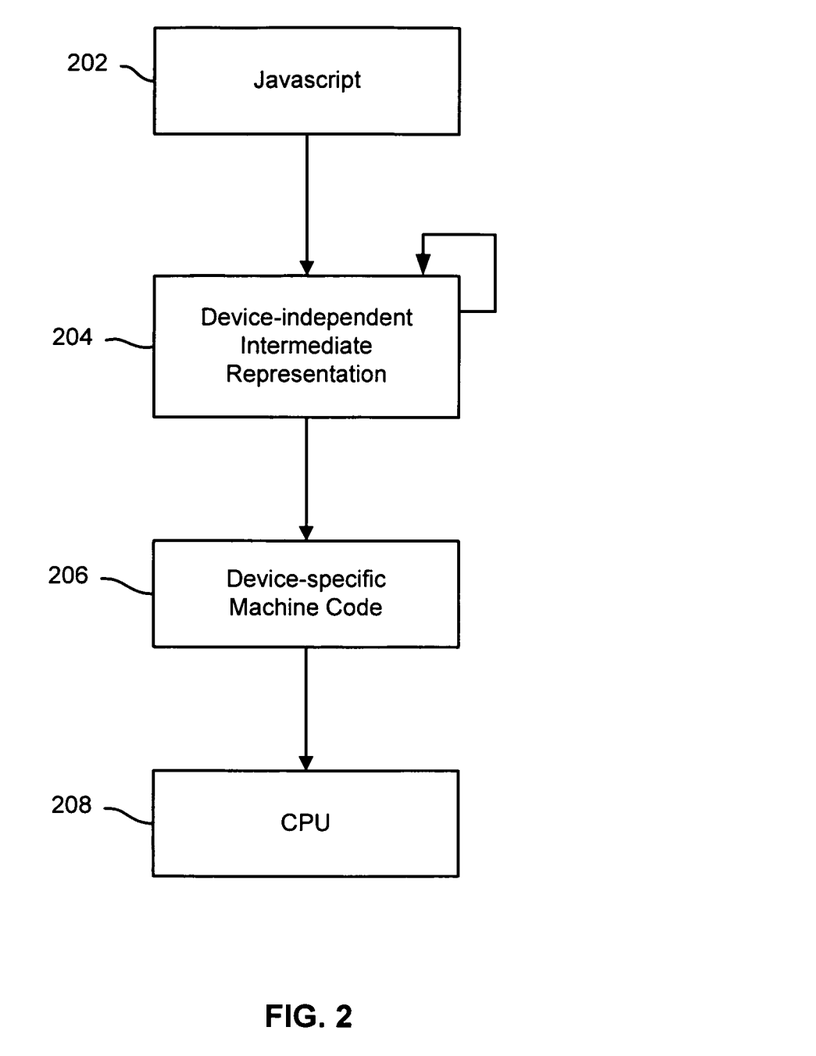
FIG. 2 is a flow diagram illustrating an embodiment of a process for providing pre-compiled machine code corresponding to code written in a traditionally interpreted language, such as JavaScript.

FIG. 2 is a flow diagram illustrating an embodiment of a process for providing pre-compiled machine code corresponding to code written in a traditionally interpreted language, such as JavaScript. In the example shown, JavaScript 202 is used to generate a corresponding device-independent intermediate representation 204 of the JavaScript 202. In various embodiments, the intermediate representation 204 is generated at or near a time when underlying JavaScript 202 first becomes available, e.g., by virtue of having been downloaded from a server or other source of the JavaScript 202 or by virtue of having been uploaded to a personal computer or other system from a PDA, phone, media player, and/or other device that is synchronized with the personal computer or other system. As shown in FIG. 2, the intermediate representation 204 in some embodiments is updated, for example at predetermined intervals and/or upon occurrence of an event, such as receiving new or revised JavaScript associated with a URL or other identifier for which a previously-generated intermediate representation based on a previous version of the JavaScript was cached. In some embodiments the personal computer or other system on which the intermediate representation has been cached is configured to check periodically to determine whether the underlying JavaScript (or other code) has been changed, e.g., by using an associated URL or other identifier to download a current version of the code, using timestamp or other information from the server providing the JavaScript, and/or generating a hash or other value based on all or a predetermined part of the content of the retrieved code, and comparing the computed value to a corresponding stored value computed based on a corresponding part of the code used to generate the cached intermediate representation or other code. If the stored computed value does not match the value computed based on the current version of the underlying JavaScript or other code, a new storable intermediate representation based on the current version is generated and cached. Subsequently, when one or more devices associated with the device or system on which the intermediate representation is cached is/are synchronized with the device or system on which the intermediate representation is cached, the cached intermediate representation is used to generate device-specific machine code 206 that is appropriate for the particular device for which the machine code is being generated. The machine code 206 is provided to the device being synchronized and is available for immediate or subsequent execution by a CPU 208 on that device. In some embodiments, the cached intermediate representation is used at runtime to generate machine code executable by the device or system on which the intermediate representation is cached. In some embodiments, the same cached intermediate representation is or may be used to generate device-specific machine code for more than one device or system each potentially requiring different machine code. In such embodiments, device-specific machine code corresponding to JavaScript or other code downloaded by one device or system is made available to each of one or more other devices in a form that is executable directly by a processor of that device, i.e., machine code appropriate for a processor on that device.

Figure 3:
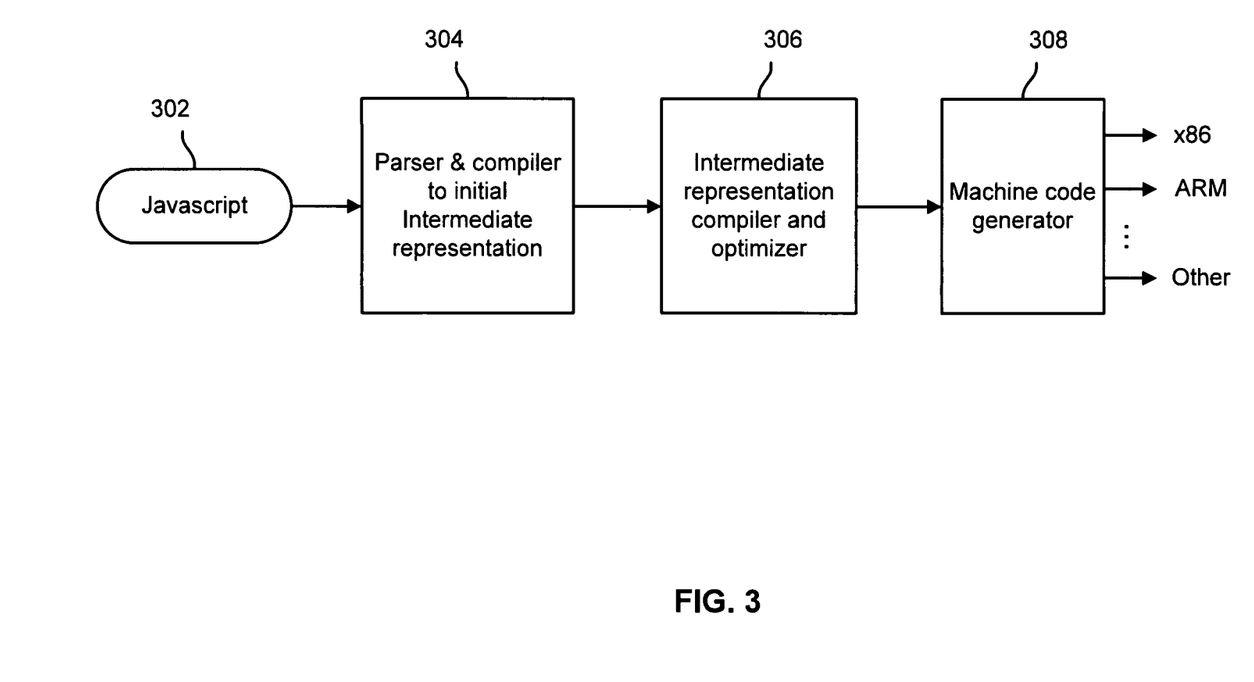
FIG. 3 is a block diagram illustrating an embodiment of a system for generating device-specific machine code based on JavaScript or another traditionally interpreted programming language.

FIG. 3 is a block diagram illustrating an embodiment of a system for generating device-specific machine code based on JavaScript or another traditionally interpreted programming language. In the example shown, JavaScript 302 is provided to a parser and initial compiler 304, which parses the JavaScript or other code and generates an intermediate representation In various embodiments, the initial intermediate representation may be bytecode or another derived representation of the original code. The initial intermediate representation is provided to an optimization and second stage compiler 306, which performs one or more optimizations on the initially generated intermediate representation and provides as output a second intermediate representation of the JavaScript 302, e.g., low level virtual machine (LLVM) or another low level intermediate representation A machine code generator 308 is configured to use the LLVM or other intermediate representation generated by optimization and second stage compiler 306 and provide to each of one or more devices or systems, for example at a subsequent device synchronization time, machine code appropriate for that device, e.g., machine code appropriate to processors of the x86, ARM, or other architectures, in the example shown in FIG. 3.

Figure 4:
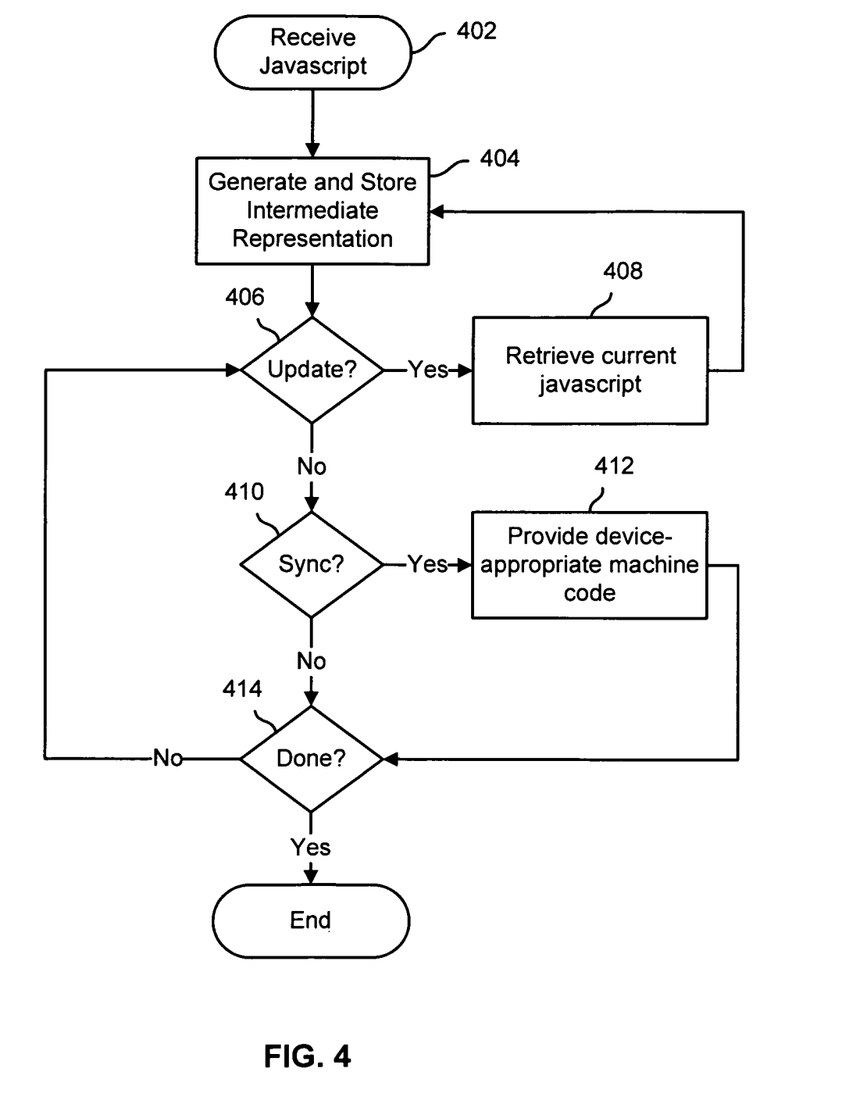
FIG. 4 is a flow diagram illustrating an embodiment of a process for generating device-specific machine code based on JavaScript or another traditionally interpreted programming language.

FIG. 4 is a flow diagram illustrating an embodiment of a process for generating device-specific machine code based on JavaScript or another traditionally interpreted programming language. In the example shown, JavaScript (or other traditionally interpreted code) is received (402) and used to generate and store an intermediate representation (404) of the received code, such as LLVM intermediate representation (IR), bytecode, or another derived representation. In various embodiments the JavaScript is received (402) from one or more sources, e.g., in connection with synchronization with a device that previously downloaded the JavaScript, e.g., from a web or other server, or directly from such a server, e.g., via an Internet and/or other network connection. If an indication that the underlying JavaScript (or other code) has been changed is received (406), the current JavaScript or other underlying code is retrieved (408) and used to generate and store an updated intermediate representation (404). Examples of retrieving updated underlying code include downloading such code via the Internet from a web or other server with which the code is associated. Upon synchronization with another device or system (410), the previously generated and stored (and if applicable updated) intermediate representation is used to generate and provide to the device being synchronized device-specific machine code appropriate for that device (412). The process of FIG. 4 continues until it is terminated (414), e.g., upon power down of a system on which it is running.

Figure 5:
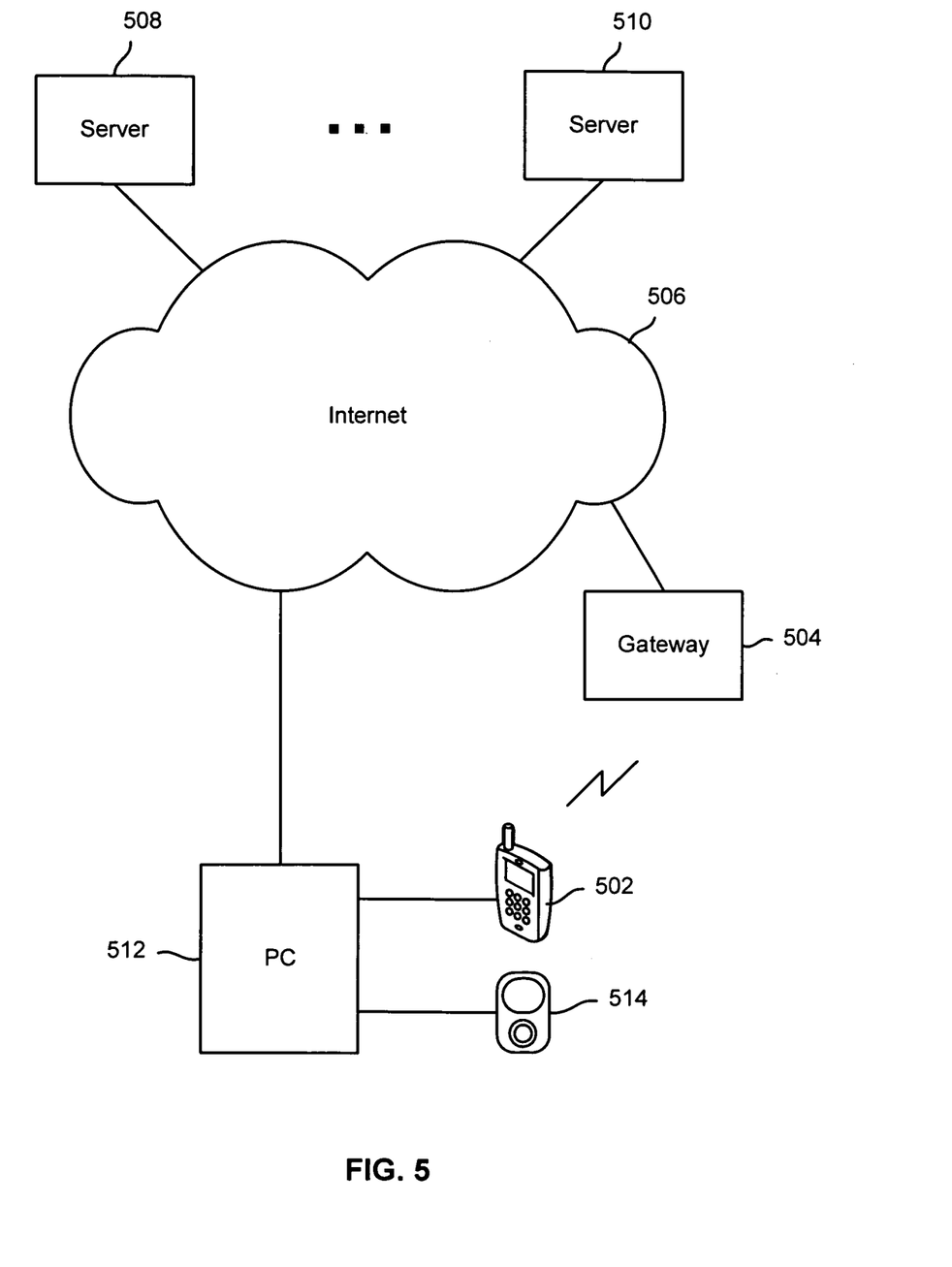
FIG. 5 is a block diagram illustrating an embodiment of a system for generating device-specific machine code based on JavaScript or another traditionally interpreted programming language.

FIG. 5 is a block diagram illustrating an embodiment of a system for generating device-specific machine code based on JavaScript or another traditionally interpreted programming language. In the example shown, a phone, PDA, portable computer, or other device 502 communicates through a gateway 504 (in various embodiments through one or more other networks, nodes, and/or devices not shown in FIG. 5) via the Internet 506 with one or more web or other servers, represented in FIG. 5 by servers 508 and 510. For example, the device 502 in some embodiments is configured to access web pages, web applications, applets, widgets, or other resources available for download from servers such as servers 508 and 510, all or some of which resources may include JavaScript or other traditionally interpreted code. In some embodiments, the device 502 is configured to determine whether machine code corresponding to such traditionally interpreted code already is available on the device, and if so to execute the machine code in lieu of interpreting the JavaScript or other traditionally interpreted code. If not, the device caches the JavaScript or other code and if needed, e.g., in response to a user gesture or other input or event, interprets the JavaScript. Later, upon synchronization with a personal computer 512 or other relatively higher power system (via a USB, network, or other wired connection, as shown in FIG. 5, or a Bluetooth, WiFi, or other wireless connection, for example), the JavaScript or other code cached previously on the device 502 is uploaded to the personal computer 512, where an intermediate representation is generated and cached, for example as in 402 and 404 of FIG. 4. In some embodiments, in connection with the synchronization machine code appropriate for device 502 is generated by PC 512 and provided to device 502, where the machine code is cached, for example for use in connection with a subsequent accessing by and/or using device 502 of a web page and/or other resource with which the underlying JavaScript (or other interpreted) code is associated. As described above, in some embodiments, PC 512 is configured to check periodically with a source of the JavaScript or other code, e.g., an applicable on of servers 508-510, to determine if the underlying JavaScript or other code has changed, and to generate and store updated byte code (or other intermediate representation) in the event of such a change. In some embodiments, the PC 512 is configured to use the stored intermediate representation to generate and provide at the time of synchronization with each of one or more other devices, such as media player 514 in the example shown in FIG. 5, machine code appropriate for that device. In this way, an intermediate representation generated and stored initially for one device can be used to make corresponding device-appropriate machine code available for each of one or more other devices, which other devices can then use in the event a user of such other devices visits the web page or resource with which the underlying JavaScript or other code is associated, enabling the device to provide the functionality associated with the code more efficiently and quickly, by executing directly the machine code provided by PC 512.

Figure 6:
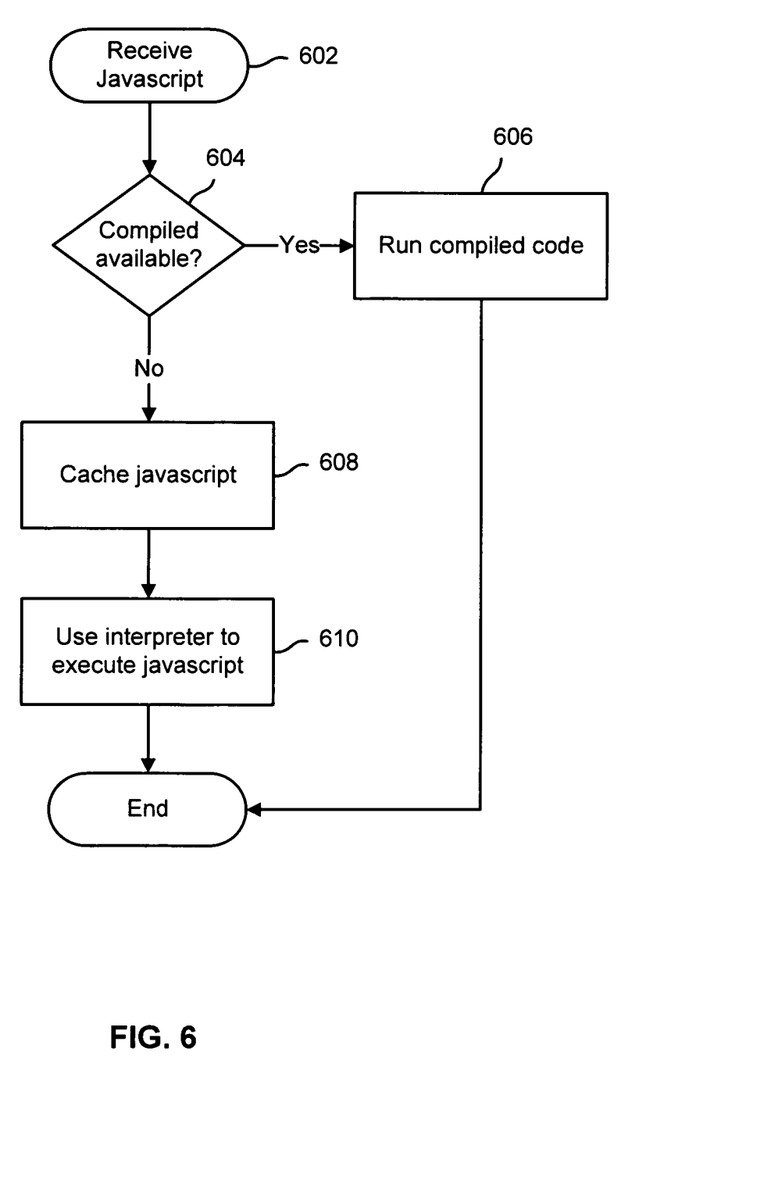
FIG. 6 is a flow chart of an embodiment of a process for processing code in a traditionally interpreted language.

FIG. 6 is a flow chart of an embodiment of a process for processing code in a traditionally interpreted language. In some embodiments, the process of FIG. 6 is implemented on a mobile or other device that receives code in a traditionally interpreted language, such as JavaScript, e.g., in connection with accessing web pages. In the example shown, upon receiving JavaScript or other traditionally interpreted code (602), it is determined whether a previously compiled version of the code is available (604). For example, a device implementing the process of FIG. 6 in some embodiments uses a URL, hash, timestamp, and/or other identifier associated with the code to determine whether a pre-compiled version of the code is available on the device. In some embodiments, such pre-compiled code may be available as a result of the device having synchronized with another device or system that provided the compiled version, as described above. If a compiled version of the code (i.e., corresponding machine code) is determined to be available (604), and if the compiled version is still valid (determined in some embodiments as described above in connection with FIG. 4), the compiled version of the code is executed (606). If not (604), or if the compiled version needs to be brought up to date with a new version from the server, the JavaScript or other traditionally interpreted code is cached (608) and an interpreter is used to execute the JavaScript or other traditionally interpreted code (610). In some embodiments, the JavaScript is cached (608) so that upon a later synchronization with another system or device the JavaScript can be provided to such other device or system, e.g., to be compiled for the providing device and/or one or more other devices, and/or to be compiled into an intermediate representation that is cached at such other device or system for later use to provide device-specific machine code to one or more devices, as described above.

Figure 7:
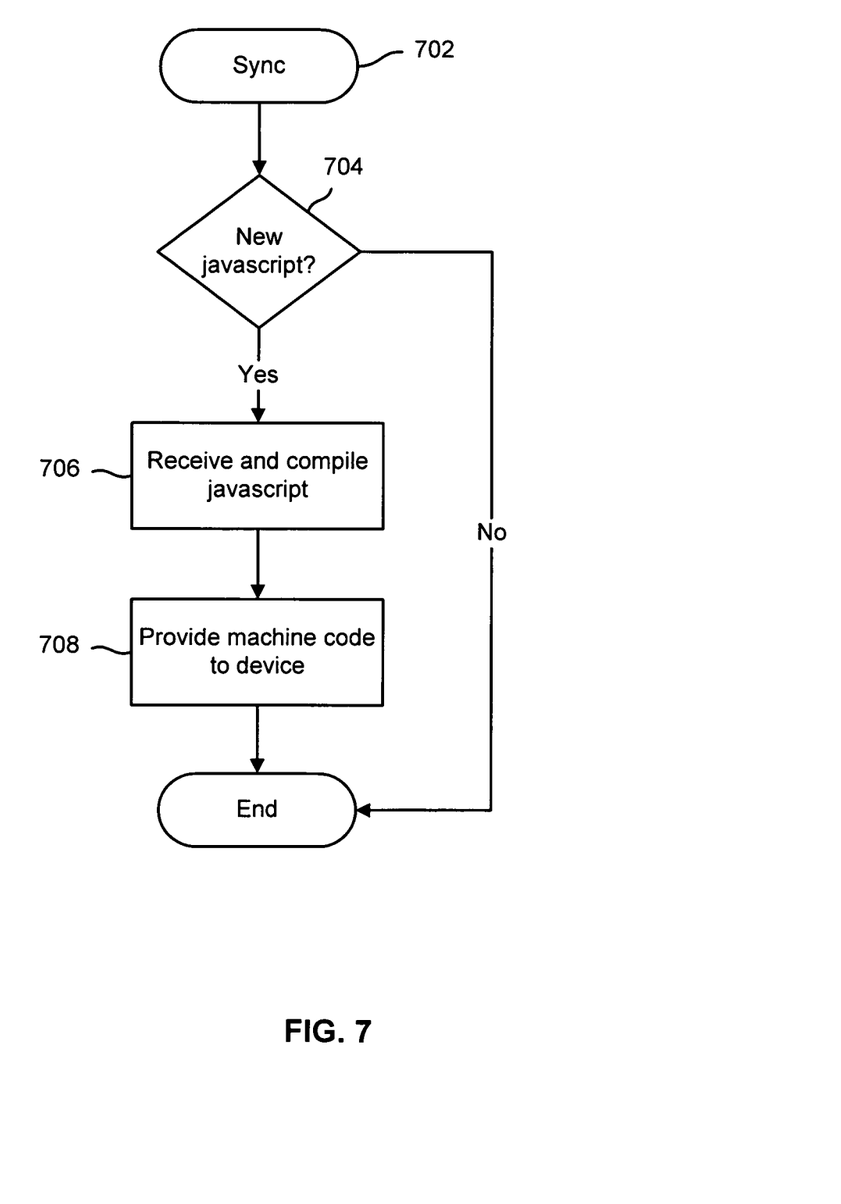
FIG. 7 is a flow diagram illustrating an embodiment of a process for synchronizing a system, such as a personal computer or server, with another system or device, such as a mobile phone, PDA, or media player.

FIG. 7 is a flow diagram illustrating an embodiment of a process for synchronizing a system, such as a personal computer or server, with another system or device, such as a mobile phone, PDA, or media player. In the example shown, upon synchronization (702) it is determined whether JavaScript or other traditionally interpreted code that has not previously been received, including without limitation an updated version of code that was received previously, is present on a device with which a system or device implementing the process of FIG. 7 is being synchronized (704). In some embodiments, determining whether new or updated JavaScript (or other code) is present includes checking a cache on the device with which synchronization is being performed to determine whether any code cached on the device is associated with a new URL or other identifier for which corresponding code has not previously been received, e.g., from this or another device or source. In some embodiments, for identifiers that are not new, it is determined whether the code as cached on the device with which synchronization is being performed is different than corresponding code received and processed previously, for example by checking hashes of all or part of the code, metadata such as timestamps, and/or one or more other indicators. If no new code is present, the process of FIG. 7 ends. If new code is determined to be present (704), the new (or updated) JavaScript or other traditionally interpreted code is received and compiled (706) and corresponding device-appropriate machine code is provided to the device with which the system or device implementing the process of FIG. 7 is being synchronized (708). In some embodiments, the compiling the JavaScript or other traditionally interpreted code (706) includes generating and caching a device-independent intermediate representation of the code, such as LLVM IR or byte code.

Figure 8:
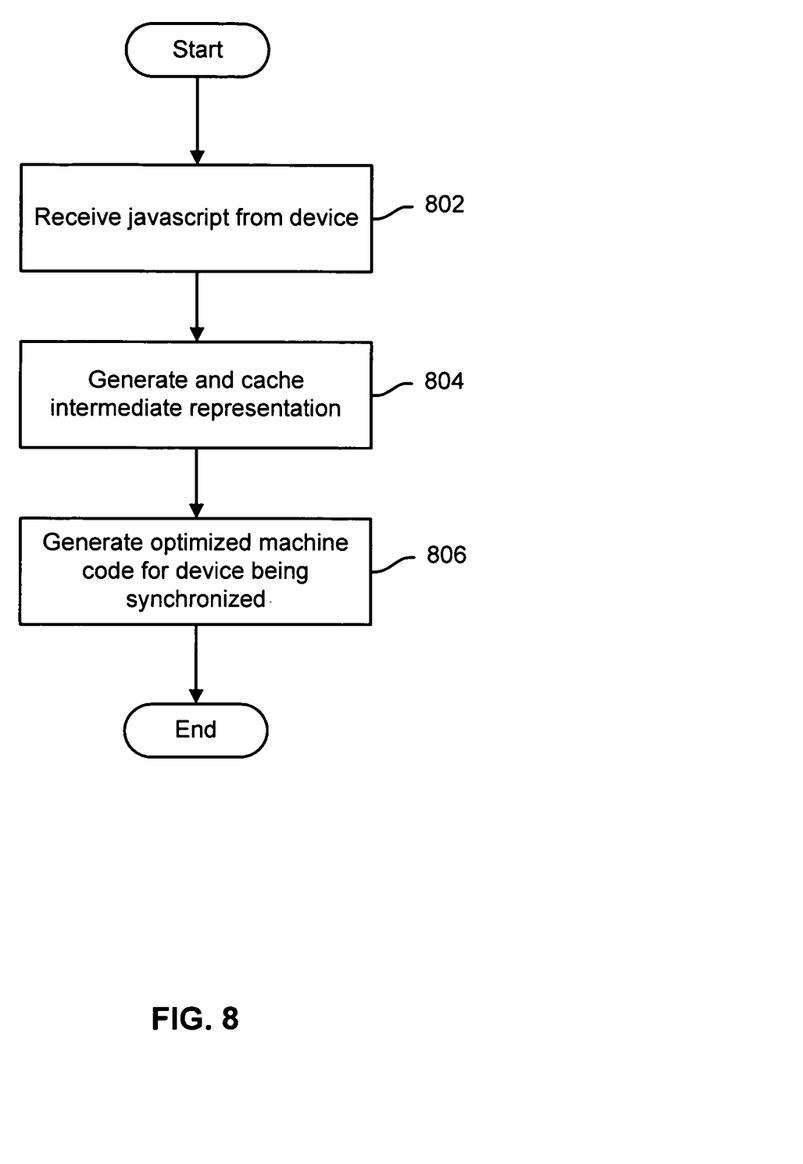
FIG. 8 is a flow chart illustrating an embodiment of a process for receiving and compiling JavaScript or other traditionally compiled code.

FIG. 8 is a flow chart illustrating an embodiment of a process for receiving and compiling JavaScript or other traditionally compiled code. In the example shown, the JavaScript is received (802). In various embodiments, the JavaScript is received from a particular device, which may have downloaded that JavaScript from another source (such as a web server), and executed the code on that device in its original form, for example using a standard interpreter. Upon a subsequent connection from the device to another system (for example, a connection of the device to a personal computer or server via wired or wireless connection), a device-independent intermediate representation, such as LLVM IR or byte code, is generated for the JavaScript by the second system and cached (804). The intermediate representation is used to generate device-appropriate optimized machine code for a device with which synchronization is being performed and from which the JavaScript or other traditionally interpreted code was received (806).

Figure 9:
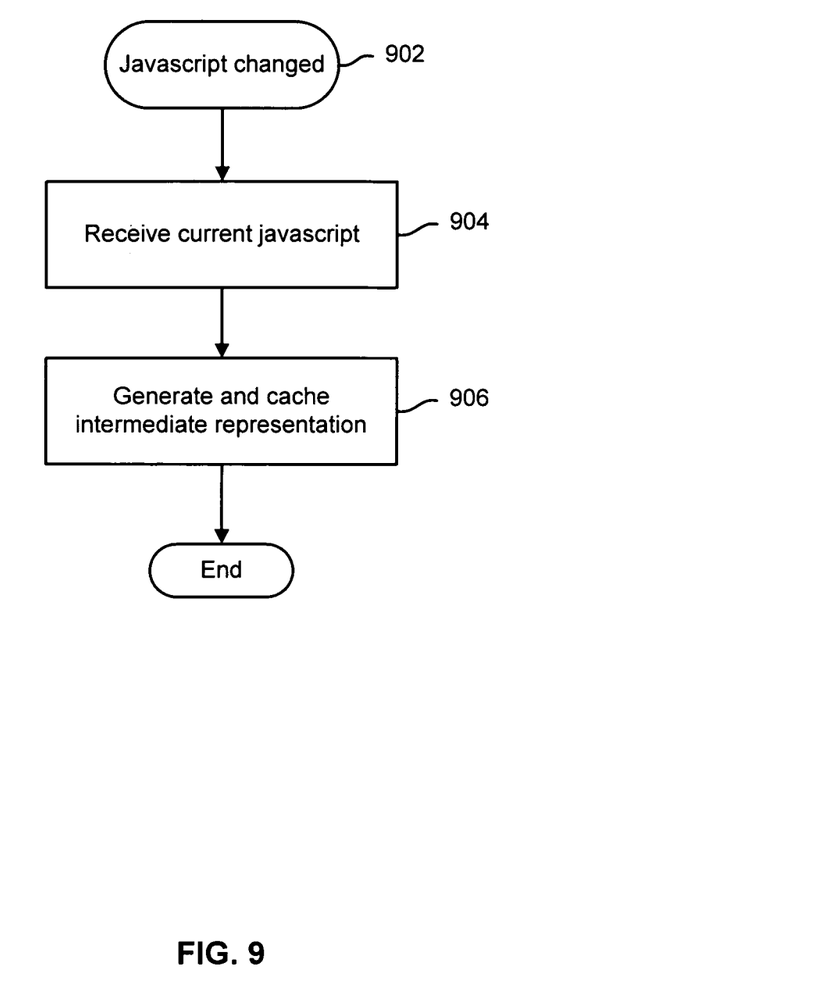
FIG. 9 is a flow chart illustrating an embodiment of a process for updating a previously-cached device-independent intermediate representation of a script or other code written in JavaScript or another traditionally interpreted programming language.

FIG. 9 is a flow chart illustrating an embodiment of a process for updating a previously-cached device-independent intermediate representation of a script or other code written in JavaScript or another traditionally interpreted programming language. In the example shown, an indication is received that JavaScript or other traditionally interpreted code for which an intermediate representation was generated and cached has changed (902). In some embodiments, a system or device that generated and/or cached the intermediate representation is configured to check periodically with a server or other source from which the JavaScript or other traditionally interpreted code originally was obtained, e.g., a web page or other resource, to determine whether the code has changed, e.g., based on a timestamp, comparing a current version of the code with a previously processed version, etc. In some embodiments, revised code may be received from a device, such as a device that earlier provided a prior version of the code. The current (revised) version of the code is received (904) and used to generate and cache an updated intermediate representation of the code (906), after which the process ends.

Figure 10:
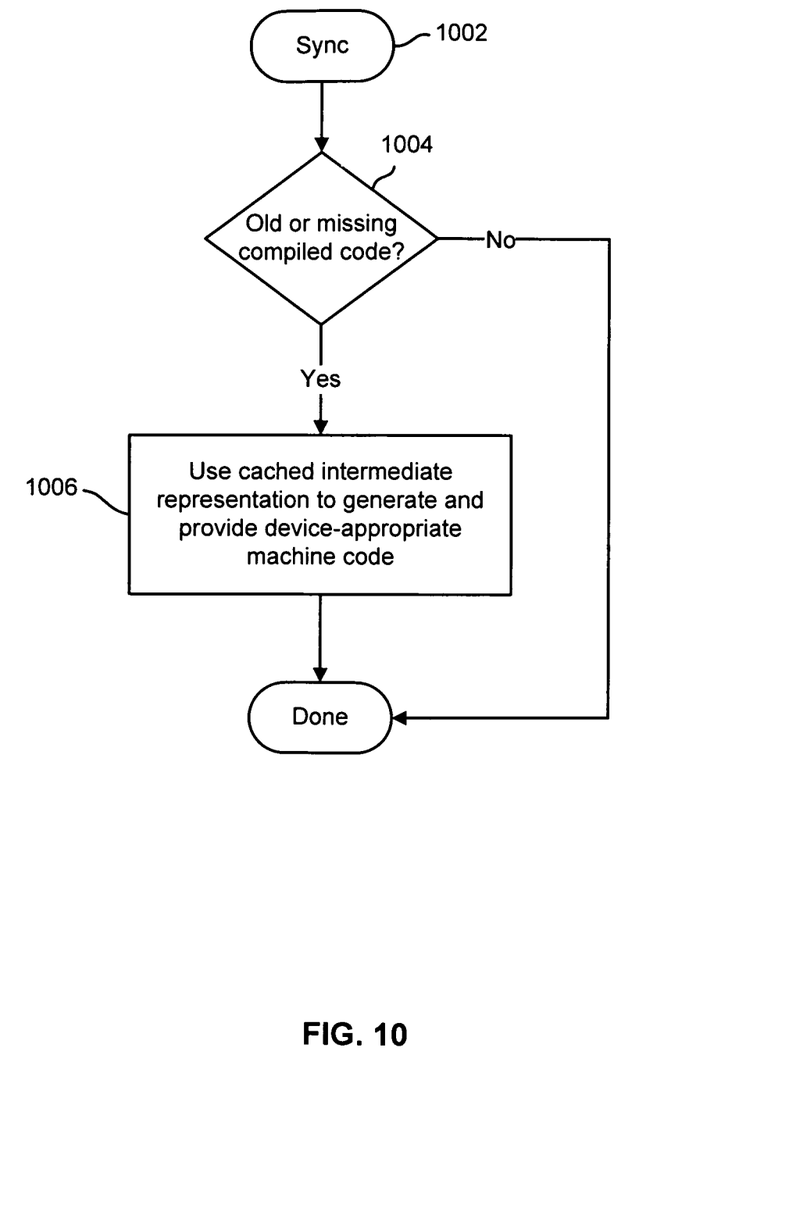
FIG. 10 is a flow diagram illustrating an embodiment of a process for providing device-appropriate machine code to a device that is being synchronized.

FIG. 10 is a flow diagram illustrating an embodiment of a process for providing device-appropriate machine code to a device that is being synchronized. In the example shown, upon synchronization (1002) it is determined whether the device with which synchronization is being performed has outdated or does not have a previously provided device-appropriate machine code corresponding to an intermediate representation, such as LLVM JR or byte code, that has been cached on a system or device implementing the process of FIG. 10. For example, JavaScript or other code received originally from a first device during a prior synchronization with the first device may have been used previously to generate and cache an LLVM-based or other device-independent intermediate representation of the JavaScript or other code, and in step 1004 of FIG. 10 in some embodiments a second device with which synchronization is being performed, or the first device in a subsequent synchronization, is checked to determine whether the device being synchronized has machine code corresponding to a current version of the cached intermediate representation. In various embodiments, a hash, timestamp, and/or one or more other identifiers, indicators, computations, and/or metadata is/are used to determine whether a version present on the device is current. If the system or device implementing the process of FIG. 10 has cached an intermediate representation for which corresponding machine code is not present on the device being synchronized (1004), the cached intermediate representation is used to generate and provide to the device device-appropriate machine code corresponding to the JavaScript or other traditionally interpreted code that was used to generate the cached intermediate representation (1006). In this way, a system or device with more power, processing, bandwidth, and/or other resources can be used to provide to each of one or more devices (updated) machine code appropriate to that device. The device then has the compiled code available to be executed, in place of the JavaScript or other traditionally interpreted code, in the event the device is used to access the resource with which the JavaScript or other traditionally interpreted code is associated, e.g., a web page, applet, application, etc.

While in some embodiments described herein an intermediate representation, such as LLVM IR or byte code, is described as being cached by a system or device that generates and provides machine code, in some embodiments the underlying JavaScript or other traditionally interpreted code is or may (for example based on a selection criterion) be cached in addition to and/or instead of an intermediate representation. However, in some embodiments an intermediate representation is cached to enable machine code to be generated and provided more quickly upon synchronization. In some embodiments, a cached intermediate representation is used to generate and cache prior to synchronization time device-appropriate machine code for one or more devices, e.g., based on a configuration data and/or learned behavior. For example, a system may be configured to support one or more specific devices or types of device, and to pre-compile for each machine code appropriate for that device, so that upon synchronization the pre-compiled code is available immediately to be provided to the device. In some embodiments, a system remembers which devices and/or types of devices have synchronized with it, for example within a configured period, and generates in advance of synchronization a machine code version for each such device or device type. In some embodiments, a device that first receives JavaScript or other traditionally interpreted code may be configured to generate and cache an intermediate representation of the code and to provide the intermediate representation to a system or device with which it is synchronized, for example to enable that system or device to cache and use the intermediate representation to generate and provide machine code to other devices.

Figure 11:
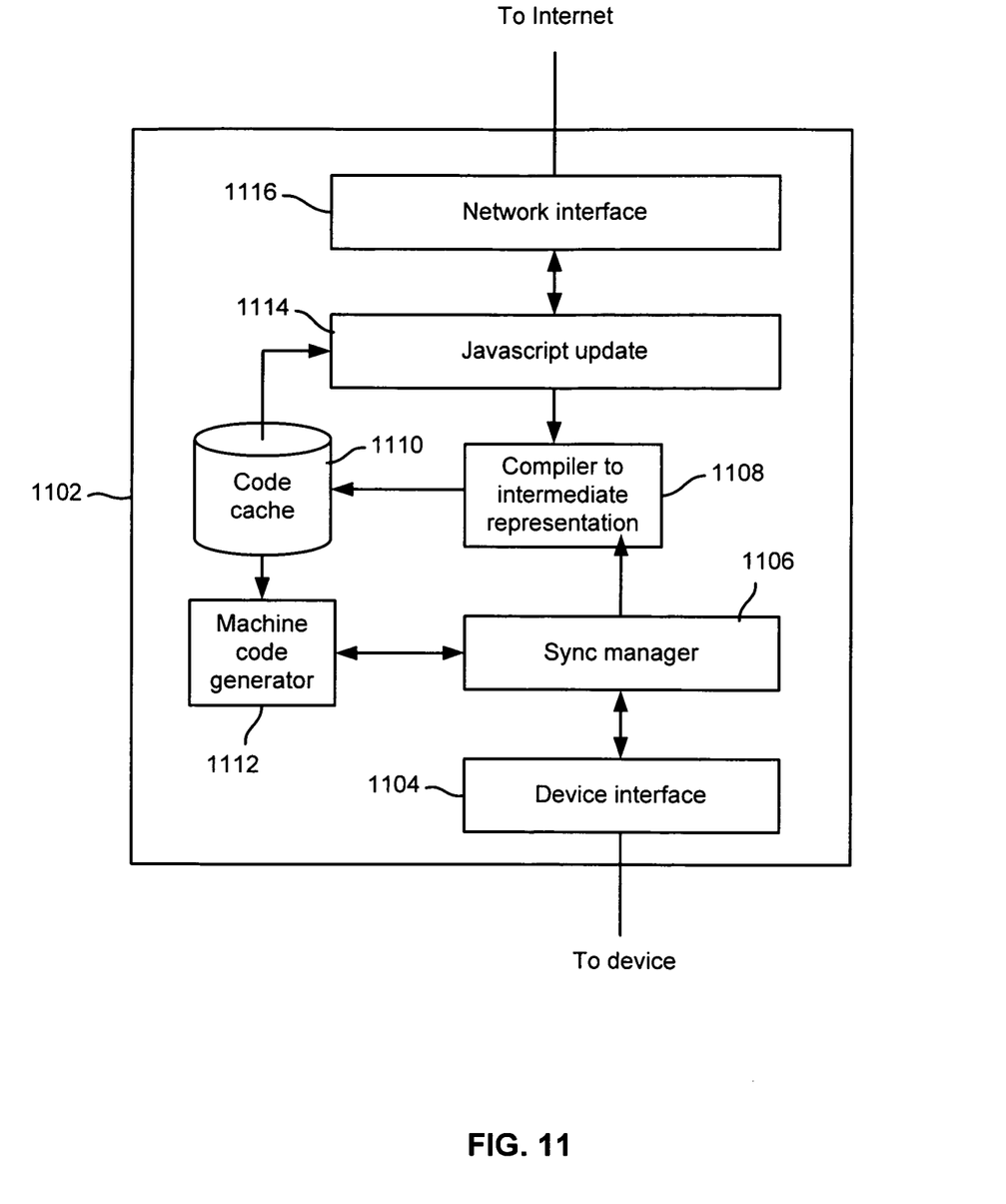
FIG. 11 is a block diagram illustrating an embodiment of a system for generating device-specific machine code based on JavaScript or another traditionally interpreted programming language.

FIG. 11 is a block diagram illustrating an embodiment of a system for generating device-specific machine code based on JavaScript or another traditionally interpreted programming language. In the example shown, the system 1102, e.g. a personal computer, server, or other computer or system, communicates via a device interface 1104 with one or more devices with which it is configured to be synchronized under the control of a synchronization manager 1106. Upon synchronization, the synchronization manager 1106 is configured to obtain from a device with which synchronization is being performed JavaScript or other traditionally interpreted code that has been cached on the device and that has not previously be received (or has been updated since having last been received) by the system 1102. Such JavaScript or other traditionally interpreted code is provided to a compiler 1108 configured to generate a device-independent intermediate representation of such code and to store the intermediate representation in a code cache 1110. The intermediate representation is used by a machine code generator 1112 to generate for and provide to a device with which synchronization is being performed machine code that is appropriate for the device. Periodically and/or upon receiving an indication that the underlying JavaScript or other traditionally interpreted code has changed, an update module 1114 communicates via a network interface 1116 to obtain updated code, which is provided to the compiler 1108 which generates and stores in code cache 1110 an updated intermediate representation. In various embodiments, one or more of synchronization manager 1106, compiler 1108, machine code generator 1112, and update module 1114 comprises a software module or other software entity running on a processor (not shown) comprising system 1102. In various embodiments, code cache 1110 is stored in a storage device and/or memory, such as a hard disk, optical, flash memory, or other drive and/or random access or other memory.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for processing computer code, comprising:
receiving, by a mobile phone from a first remote system, a source code, wherein the source code is in an interpretable programming language;
caching the source code on the mobile phone;
establishing a wireless connection with a second remote system;
transmitting, through the wireless connection and to the second remote system, the source code as well as information that identifies the first remote system;

receiving, through the wireless connection from the second remote system, at least one of an intermediate representation of the source code and a machine code representation of the source code, wherein:
the machine code representation of the source code is specific to a hardware configuration of the mobile phone,
the second remote system is configured to periodically check the first remote system to determine if the source code has changed,
the second remote system is configured to acquire the changed source code and generate and cache at least one of an intermediate representation of the changed source code and a machine code representation of the changed source code, and
the machine code representation of the changed source code is specific to the hardware configuration of the mobile phone;
closing the wireless connection between the mobile phone and the second remote system;
storing, on the mobile phone, the intermediate representation of the source code or the machine code representation of the source code;
establishing a subsequent wireless connection with the second remote system;
receiving, through the subsequent wireless connection with the second remote system, the intermediate representation of the changed source code or the machine code representation of the changed source code; and
caching, by the mobile phone, the intermediate representation of the changed source code or the machine code representation of the changed source code on the mobile phone.

2. The method of claim 1, wherein the source code comprises JavaScript.

3. The method of claim 1, wherein the intermediate representation of the source code comprises an LLVM intermediate representation (IR), an LLVM byte code or other byte code, or another appropriate device-independent intermediate representation.

4. The method of claim 1, wherein the intermediate representation of the source code is stored on the mobile phone at a first time, and the mobile phone uses the intermediate representation to generate machine code at a second time subsequent to the first time.

5. The method of claim 1, wherein determining whether the source code has changed comprises using a resource identifier associated with the intermediate representation of the source code to check whether the source code has changed.

6. The method of claim 5, wherein using the resource identifier associated with the intermediate representation to check whether the source code has changed comprises using the resource identifier to retrieve a current version of the source code and comparing a value associated with the retrieved current version of the source code to a corresponding previously stored value.

7. The method of claim 6, wherein the value comprises a value computed based at least in part on at least a portion of the retrieved current version of the source code.

8. The method of claim 5, wherein using the resource identifier associated with the intermediate representation to check whether the source code has changed comprises using the resource identifier to access a metadata associated with the source code and using the metadata to determine whether the source code has changed.

9. A mobile phone, comprising:
a storage mechanism; and
a processor coupled to the storage mechanism and configured to:
receive, from a first remote system, a source code, wherein the source code is in an interpretable programming language;
cache the source code;
establish a wireless connection with a second remote system;
transmit, through the wireless connection and to the second remote system, the source code as well as information that identifies the first remote system;
receive, through the wireless connection from the second remote system, at least one of an intermediate representation of the source code and a machine code representation of the source code, wherein:
the machine code representation of the source code is specific to a hardware configuration of the mobile phone,
the second remote system is configured to periodically check the first remote system to determine if the source code has changed,
the second remote system is configured to acquire the changed source code and generate and cache at least one of an intermediate representation of the changed source code and a machine code representation of the changed source code, and
the machine code representation of the changed source code is specific to the hardware configuration of the mobile phone;
close the wireless connection with the second remote system;
store the intermediate representation of the source code or the machine code representation of the source code;
establish a subsequent wireless connection with the second remote system;
receive, through the subsequent wireless connection with the second remote system, the intermediate representation of the changed source code or the machine code representation of the changed source code; and
cache the intermediate representation of the changed source code or the machine code representation of the changed source code on the mobile phone.

10. The mobile phone of claim 9, wherein the intermediate representation of the source code comprises an LLVM intermediate representation (IR), an LLVM byte code or other byte code, or another appropriate device-independent intermediate representation.

11. The mobile phone of claim 9, wherein the intermediate representation of the source code is stored on the mobile phone at a first time, and the mobile phone uses the intermediate representation to generate machine code at a second time subsequent to the first time.

12. The mobile phone of claim 9, further comprising a device interface configured to enable the processor to communicate with the first remote system.

13. The mobile phone of claim 9, further comprising a network interface configured to enable the processor to wirelessly communicate with the second remote system.

14. A non-transitory computer readable storage medium configured to store instructions that, when executed by a processor included in a computing device, cause the computing device to:
establish a wireless connection with a mobile phone;
receive, through the wireless connection and from the mobile phone, a source code as well as information that identifies a first remote system, wherein the source code is in an interpretable programming language and received by the mobile phone from the first remote system, and the mobile phone is configured to cache the source code;

generate and cache at least one of an intermediate representation of the source code and a machine code representation of the source code, wherein the machine code representation of the source code is specific to a hardware configuration of the mobile phone;

send, through the wireless connection to the mobile phone, the intermediate representation of the source code or the machine code representation of the source code;

close the wireless connection to the mobile phone, wherein the mobile phone is configured to store the intermediate representation of the source code or the machine code representation of the source code;

periodically check the first remote system to determine if the source code has changed;

acquire the changed source code;

generate and cache at least one of an intermediate representation of the changed source code and a machine code representation of the changed source code;

establish a subsequent wireless connection with the mobile phone; and send, through the subsequent wireless connection to the mobile phone, the intermediate representation of the changed source code or the machine code representation of the changed source code, wherein the mobile phone is configured to cache the intermediate representation of the changed source code or the machine code representation of the changed source code.

15. The non-transitory computer-readable storage medium of claim 14, wherein the intermediate representation of the source code comprises an LLVM intermediate representation (IR), an LLVM byte code or other byte code, or another appropriate device-independent intermediate representation.

16. The non-transitory computer-readable storage medium of claim 14, wherein the intermediate representation of the source code is stored on the mobile phone at a first time, and the mobile phone uses the intermediate representation to generate machine code at a second time subsequent to the first time.

17. A device, comprising:
a communication interface configured to provide communication with an external node; and
a processor coupled to the communication interface and configured to:
establish a wireless connection with a mobile phone;
receive, through the wireless connection and from the mobile phone, a source code and information that identifies a first remote system, wherein the source code is in an interpretable programming language and received by the mobile phone from the first remote system, and the mobile phone is configured to cache the source code;

generate and cache at least one of an intermediate representation of the source code and a machine code representation of the source code, wherein the machine code representation of the source code is specific to a hardware configuration of the mobile phone;

send, through the wireless connection to the mobile phone, the intermediate representation of the source code or the machine code representation of the source code;

close the wireless connection to the mobile phone, wherein the mobile phone is configured to store the intermediate representation of the source code or the machine code representation of the source code;

periodically check the first remote system to determine if the source code has changed;

acquire the changed source code;

generate and cache at least one of an intermediate representation of the changed source code and a machine code representation of the changed source code;

establish a subsequent wireless connection with the mobile phone; and send, through the subsequent wireless connection to the mobile phone, the intermediate representation of the changed source code or the machine code representation of the changed source code, wherein the mobile phone is configured to cache the intermediate representation of the changed source code or the machine code representation of the changed source code.

18. The device of claim 17, wherein the intermediate representation of the source code comprises an LLVM intermediate representation (IR), an LLVM byte code or other byte code, or another appropriate device-independent intermediate representation.

19. The device of claim 17, wherein the intermediate representation of the source code is stored on the mobile phone at a first time, and the mobile phone uses the intermediate representation to generate machine code at a second time subsequent to the first time.

20. The device of claim 17, wherein determining whether the source code has changed comprises using a resource identifier associated with the intermediate representation of the source code to check whether the source code has changed.

* * * * *